(12) United States Patent
Bartel et al.

(10) Patent No.: US 8,807,575 B2
(45) Date of Patent: *Aug. 19, 2014

(54) MASS TRANSIT VEHICLE

(71) Applicant: ARBOC Technologies LLC, Commerce Township, MI (US)

(72) Inventors: James J. Bartel, Commerce Township, MI (US); Ronald A. Byrd, Gilbraltar, MI (US)

(73) Assignee: Arboc Specialty Vehicles, LLC, Middlebury, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,458

(22) Filed: Feb. 8, 2013

(65) Prior Publication Data

US 2013/0168165 A1    Jul. 4, 2013

Related U.S. Application Data

(63) Continuation of application No. 12/890,918, filed on Sep. 27, 2010, now Pat. No. 8,371,589, which is a continuation-in-part of application No. 12/243,222, filed on Oct. 1, 2008, now Pat. No. 7,802,801.

(60) Provisional application No. 60/976,957, filed on Oct. 2, 2007, provisional application No. 60/989,188, filed on Nov. 20, 2007.

(51) Int. Cl.
| | |
|---|---|
| B60G 17/00 | (2006.01) |
| B62D 31/02 | (2006.01) |
| A61G 3/06 | (2006.01) |
| B60G 11/27 | (2006.01) |
| B62D 47/02 | (2006.01) |
| B60G 3/20 | (2006.01) |

(52) U.S. Cl.
CPC .......... *B62D 31/02* (2013.01); *B60G 2300/024* (2013.01); *B60G 2202/152* (2013.01); *B60G 2204/126* (2013.01); *B60G 2800/202* (2013.01); *B60G 2300/02* (2013.01); *A61G 3/065* (2013.01); *B60G 2200/144* (2013.01); *B60G 2300/14* (2013.01); *B60G 2300/34* (2013.01); *A61G 3/061* (2013.01); *B60G 17/00* (2013.01); *B60G 2800/203* (2013.01); *B60G 11/27* (2013.01); *B62D 47/02* (2013.01); *B60G 2300/38* (2013.01); *B60G 2202/412* (2013.01); *B60G 2800/204* (2013.01); *B60G 3/20* (2013.01); *B60G 2204/143* (2013.01)
USPC .......... 280/6.152; 280/788; 296/178

(58) Field of Classification Search
USPC ............ 280/6.152, 6.151, 781, 788; 296/178, 296/25, 146.4, 204
See application file for complete search history.

(56) References Cited

U.S. PATENT DOCUMENTS

| | | | |
|---|---|---|---|
| 2,151,633 | A | 3/1939 | Black |
| 2,527,487 | A | 10/1950 | Paton |

(Continued)

FOREIGN PATENT DOCUMENTS

| | | |
|---|---|---|
| CH | 392284 A | 5/1965 |
| EP | 0464412 A1 | 6/1991 |

(Continued)

OTHER PUBLICATIONS

International Search Report, Application No. PCT/US2008/078393, dated May 14, 2009.

*Primary Examiner* — Drew Brown
(74) *Attorney, Agent, or Firm* — McKee, Voorhees & Sease (57) ABSTRACT

A mass transit vehicle includes one or a combination of the following: floor portions that are angled for creating an incline of a floor of the buss; a door or entranceway that is angle relative to a fore-aft axis of the vehicle; and/or an entranceway that opens a relatively low height relative to the ground.

12 Claims, 10 Drawing Sheets

(56) References Cited

U.S. PATENT DOCUMENTS

| | | |
|---|---|---|
| 3,011,578 A | 12/1961 | De Lorean |
| 3,633,775 A | 1/1972 | Pugliese |
| 3,666,036 A | 5/1972 | Scerbo |
| 3,787,073 A | 1/1974 | Lievore |
| 3,901,096 A | 8/1975 | Woody |
| 3,951,225 A | 4/1976 | Schwenk |
| 4,027,807 A | 6/1977 | Thorley |
| 4,039,037 A | 8/1977 | Vin |
| 4,064,956 A | 12/1977 | Wildey |
| 4,167,286 A | 9/1979 | Geyer |
| 4,180,138 A | 12/1979 | Shea |
| 4,205,729 A | 6/1980 | Morino |
| 4,220,349 A | 9/1980 | Gaussin |
| 4,248,455 A | 2/1981 | Manning |
| 4,260,315 A | 4/1981 | Bouffard |
| 4,353,429 A | 10/1982 | Herron |
| 4,355,696 A | 10/1982 | Moll |
| 4,453,735 A | 6/1984 | Penverne et al. |
| 4,513,834 A | 4/1985 | Hayashi et al. |
| 4,568,094 A | 2/1986 | Lovell |
| 4,606,433 A | 8/1986 | Smalley et al. |
| 4,662,467 A | 5/1987 | Arai et al. |
| 4,690,238 A | 9/1987 | Von Sivers et al. |
| 4,705,128 A | 11/1987 | Krude |
| 4,709,778 A | 12/1987 | Von Sivers |
| 4,723,790 A | 2/1988 | Wharton |
| 4,878,691 A | 11/1989 | Cooper et al. |
| 4,934,733 A | 6/1990 | Smith et al. |
| 4,946,333 A | 8/1990 | Boatright |
| 5,012,885 A | 5/1991 | Hilden |
| 5,016,912 A | 5/1991 | Smith et al. |
| 5,099,943 A | 3/1992 | Resca et al. |
| 5,215,329 A | 6/1993 | Santo |
| 5,275,430 A | 1/1994 | Smith |
| 5,469,931 A | 11/1995 | Kawata et al. |
| 5,577,793 A | 11/1996 | Kobasic |
| 5,609,219 A | 3/1997 | Watson et al. |
| 5,700,026 A | 12/1997 | Zalewski et al. |
| 5,810,544 A | 9/1998 | Wellman |
| 5,863,070 A | 1/1999 | William et al. |
| 5,868,418 A | 2/1999 | VanDenberg |
| 5,887,880 A | 3/1999 | Mullican et al. |
| 5,907,973 A | 6/1999 | Van Wonterghem |
| 5,954,352 A | 9/1999 | Rumpel et al. |
| 6,035,956 A | 3/2000 | Maurer et al. |
| 6,039,351 A | 3/2000 | Jones et al. |
| 6,095,747 A | 8/2000 | Cohn |
| 6,098,995 A | 8/2000 | Danis |
| 6,142,496 A | 11/2000 | Bartel |
| 6,205,877 B1 | 3/2001 | Vilain |
| 6,305,897 B1 | 10/2001 | Budd et al. |
| 6,345,680 B1 | 2/2002 | Hill |
| 6,398,251 B1 | 6/2002 | Smith |
| 6,428,026 B1 | 8/2002 | Smith |
| 6,648,579 B2 | 11/2003 | Vartanian, Sr. |
| 6,702,057 B1 | 3/2004 | Bartel |
| 7,232,004 B2 | 6/2007 | Bartel |
| 7,523,978 B1 | 4/2009 | Timmermans et al. |
| 2006/0237941 A1 | 10/2006 | Smith et al. |
| 2006/0245883 A1 | 11/2006 | Fontaine et al. |
| 2007/0068723 A1 | 3/2007 | Brill et al. |

FOREIGN PATENT DOCUMENTS

| | | |
|---|---|---|
| GB | 2322604 A | 9/1998 |
| JP | 05-050831 A | 3/1993 |
| JP | 2001-001836 A | 1/2001 |
| LU | 71578 A1 | 6/1975 |
| WO | 02/38417 A2 | 5/2002 |
| WO | 03/106247 A1 | 12/2003 |

MASS TRANSIT VEHICLE

CLAIM OF PRIORITY

This application is a continuation of Ser. No. 12/890,918 filed on Sep. 27, 2010 now U.S. Pat. No. 8,371,580, which is a continuation in part of Ser. No. 12/243,222 filed Oct. 1, 2008, now U.S. Pat. No. 7,802,801 and claims priority therefrom. This application further claims priority from provisional application Ser. No. 60/976,957 filed Oct. 2, 2007 and 60/989,188 filed Nov. 20, 2007, both incorporated herein by reference.

TECHNICAL FIELD

The present invention generally relates to an improved mass transit vehicle (e.g., a bus, a multi-passenger recreation vehicle, a train, or the like) and methods of forming that vehicle.

BACKGROUND OF THE INVENTION

Manufacture of mass transit vehicles and particularly busses can be problematic since there are numerous considerations involved when designing such a vehicle. Passenger comfort is one consideration. Passenger capacity, particularly the amount of seating or passenger locations, on a bus is another consideration. Accessibility for handicap individuals and others is yet another consideration.

In addition to these general considerations, specific regulations have been created by government entities requiring busses to have certain characteristics. For example, certain requirements for dimensions for bus entrances have been developed as well as requirements for providing accessibility to the bus. These regulations or requirements in the U.S., specifically in regards to accessibility guidelines for vehicles, are codified at 36 CFR Part 1192 as amended through September 1998, which are expressly incorporated herein by reference for all purposes and are at least partially summarized below.

In view of the above, the present invention is directed toward a bus that improves upon one or more of the bus design considerations and/or abides by one or more of the aforementioned bus or mass transit regulations.

SUMMARY OF THE INVENTION

The present invention solves one or more of the above problems by providing improved bus design and methods that facilitate for providing accessibility to the vehicle, especially for use by handicapped individuals and being at least compliant to in part to 36 CFR Part 1192 as amended through September 1998, particularly Subpart B Sections 1192.21, 1192.23, and 1192.25.

Accordingly, pursuant to one aspect of the present invention, there is contemplated a mass transit vehicle, having a drive motor, a drive transmission, suspension system, a body structure that may include at least one passenger entranceway, and at least four tires mounted on at least four wheels mounted on at least two on a front and at least two on a rear axle respectively, the mass transit vehicle having a frame assembly adapted for supporting the body structure, the drive motor, the drive transmission, and the suspension system, wherein the frame assembly may include a variable sectional height; the body structure may include a driver portion disposed forward of a passenger portion wherein the at least one passenger entranceway can be located in the passenger portion and the passenger portion having a floor having one, two, three, or more panel portions disposed at an angle to form an incline, the passenger entranceway may be defined by a door frame with a lower portion disposed as an angle relative to a for/aft axis of the bus and the lower portion of the passenger entranceway disposed no greater than about 12 inches (33.0 cm) from a flat surface upon which the wheels of the mass transit vehicle are disposed; the drive motor connected to the drive transmission, both may be disposed substantially near a front end of the vehicle and disposed at a drive angle, for transmitting drive power the rear axle via a drive shaft that is substantially unitary, wherein "unitary" for the purposes of this invention includes multi-piece shafts but do not include transmission shafts with a drop-box; the suspension system connected to the body structure and the frame assembly adapted to raise and lower the body structure, the drive motor and the drive transmission vertically relative to the flat surface upon which the wheels of the mass transit vehicle are disposed; and a deployable ramp connectively disposed at the lower portion of the passenger entranceway that may be adapted to provide an access pathway from at least the flat surface upon which the wheels of the bus are disposed to the floor of the passenger portion.

The invention may be further characterized by one or any combination of the features described herein, such as the variable sectional height of the frame assembly may be disposed lower at the back of the driver portion or front of passenger portion to clear the deployable ramp. The angle relative to a for/aft axis of the mass transit vehicle of the passenger entranceway may be at least greater than about 5° and less than about 30°. The drive angle of the drive motor and the drive transmission may be at least about 3.0° and less than about 6.5° in a downward direction from the front to the rear of the mass transit vehicle relative to the flat surface upon which the wheels of the mass transit vehicle are disposed thereto. In one embodiment, the suspension system can move vertically a distance relative to the flat surface at least greater than about 2.75 inches (7.0 cm) and less than about 5 inches (14.0 cm). The mass transit vehicle can have a wheelbase of at least greater than about 135 inches (345 cm) and less than about 260 inches (660 cm). The drive shaft may be a minimum distance of about 10 inches (26.0 cm) from the flat surface upon which the wheels of the mass transit vehicle are disposed thereto and at least about 0.4 inches (1.0 cm) below a bottom side of the floor. The deployable ramp, in a deployed position, may have a ramp angle no greater than about 14° relative to the flat surface upon which the wheels of the mass transit vehicle are disposed thereto and the deployable ramp in the deployed position can be at least about 3 feet (1.0 m) to about 8 feet (2.5 m) in length. It is understood that the vehicle can have any combination of these features and that none of the features are required unless otherwise stated.

Accordingly, pursuant to another aspect of the present invention, there is contemplated a mass transit vehicle with a wheelbase of at least greater than about 135 inches (345 cm) and less than about 780 inches (1980 cm), having a drive motor, a drive transmission, suspension system, a body structure including at least one passenger entranceway and at least four tires mounted on at least four wheels mounted on at least two on a front and at least two on a rear axle respectively, the mass transit vehicle may include a frame assembly adapted for supporting the body structure, the drive motor, the drive transmission and the suspension system, wherein the frame assembly may include a variable sectional height; the body structure may include a driver portion disposed forward of a passenger portion wherein the at least one passenger entranceway may be located in the passenger portion and the passenger portion may include a floor having one, two, three or more panel portions disposed at angle to form an incline, the passenger entranceway may be defined by a door frame with a lower portion disposed as an angle of at least about 5° relative to a for/aft axis of the bus and the lower portion of the passenger entranceway disposed no greater than about 14 inches (35.5 cm) from a flat surface upon which the wheels of the mass transit vehicle are disposed; the drive motor connected to the drive transmission, both may be disposed substantially near a front end of the vehicle and may be disposed at a drive angle of at least about 3.0° in a downward direction from the front to the rear of the mass transit vehicle relative to the flat surface upon which the wheels of the mass transit vehicle are disposed thereto, for transmitting drive power to the rear axle via a drive shaft that may be substantially unitary; the suspension system may be connected to the body structure and the frame assembly adapted to raise and lower the body structure, the drive motor and the drive transmission vertically a distance of at least about 0.4 inches (7.0 cm) relative to the flat surface upon which the wheels of the mass transit vehicle are disposed; and a deployable ramp connectively disposed at the lower portion of the passenger entranceway can be adapted to provide an access pathway from at least the flat surface upon which the wheels of the bus are disposed to the floor of the passenger portion, wherein the deployable ramp in a deployed position may have a ramp angle no greater than about 14° relative to the flat surface upon which the wheels of the mass transit vehicle are disposed thereto.

Accordingly, pursuant to another aspect of the present invention, there is contemplated a mass transit vehicle, having at least four tires, mounted on at least four wheels, at least two mounted on a front axle, and at least two on a rear axle respectively, the mass transit vehicle including: a frame assembly adapted for supporting a body structure including at least one passenger entranceway, wherein the frame assembly includes a variable sectional height; the body structure including a driver portion disposed forward of a passenger portion wherein the at least one passenger entranceway is located in the driver portion and the driver portion and passenger portion includes a floor having one, two, three, or more panel portions disposed at an angle to form an incline, the passenger entranceway defined by a door frame with a lower portion disposed at an angle relative to a fore/aft axis of the mass transit vehicle and the lower portion of the passenger entranceway disposed no greater than about 35.5 cm from a flat surface, when the wheels of the mass transit vehicle are disposed upon the flat surface; a drive motor connected to a drive transmission, both at least partially supported by the frame assembly disposed substantially near a rear end of the vehicle and disposed at a drive angle, for transmitting power to the rear axle via a drive shaft that is substantially unitary; a suspension system connected to the body structure and the frame assembly; and a deployable ramp connectively disposed at the lower portion of the passenger entranceway adapted to provide an access pathway from at least the flat surface upon which the wheels of the mass transit vehicle are disposed to the floor of the passenger portion.

The invention may be further characterized by one or any combination of the features described herein, such as the variable sectional height of the frame assembly is disposed lower at the back of the driver portion or front of the passenger portion to clear the deployable ramp; the angle relative to a fore/aft axis of the mass transit vehicle of the passenger entranceway is at least greater than about 5° and less than about 30°; the drive motor includes a hybrid system; the suspension system is adapted to raise and lower the body structure, the drive motor and the drive transmission vertically relative to the flat surface upon which the wheels of the mass transit vehicle are disposed; the mass transit vehicle has a wheelbase of at least greater than about 670 cm and less than about 1200 cm; the drive shaft is a minimum distance of about 26 cm from the flat surface upon which the wheels of the mass transit vehicle are disposed thereto and at least about 1 cm below a bottom side of the floor; the deployable ramp in a deployed position having a ramp angle no greater than about 14° relative to the flat surface upon which the wheels of the mass transit vehicle are disposed thereto; the deployable ramp in the deployed position is at least about 1.0 m to about 2.5 m in length; the angle to form an incline of the passenger portion floor is individually less than about 4.7° from the flat surface in any of the one, two, three, or more panel portions respectively.

Accordingly, pursuant to another aspect of the present invention, there is contemplated a mass transit vehicle with a wheelbase of at least greater than about 670 cm and less than about 1200 cm, having at least four tires mounted on at least four wheels, at least two mounted on a front axle and at least two on a rear axle respectively, the mass transit vehicle including: a frame assembly adapted for supporting a body structure including at least one passenger entranceway, wherein the frame assembly includes a variable sectional height; the body structure including a driver portion disposed forward of a passenger portion wherein the at least one passenger entranceway is located in the driver portion and the driver portion and passenger portion includes a floor having one, two, three or more panel portions disposed at angle to form an incline, the passenger entranceway defined by a door frame with a lower portion disposed as an angle of at least about 0° relative to a fore/aft axis of the mass transit vehicle and the lower portion of the passenger entranceway disposed no greater than about 35.5 cm from a flat surface upon which the wheels of the mass transit vehicle are disposed; a drive motor connected to a drive transmission, both at least partially supported by the frame assembly disposed substantially near a rear end of the vehicle for transmitting power the rear axle via a drive shaft; a suspension system connected to the body structure and the frame assembly, the suspension system adapted to raise and lower the body structure, the drive motor and the drive transmission vertically a distance of at least about 7.0 cm relative to the flat surface upon which the wheels of the mass transit vehicle are disposed; and a deployable ramp connectively disposed at the lower portion of the passenger entranceway adapted to provide an access pathway from at least the flat surface upon which the wheels of the mass transit vehicle are disposed to the floor of the passenger portion, wherein the deployable ramp in a deployed position having a ramp angle no greater than about 14° relative to the flat surface upon which the wheels of the mass transit vehicle are disposed thereto.

BRIEF DESCRIPTION OF THE DRAWING

The features and inventive aspects of the present invention will become more apparent upon reading the following detailed description, claims, and drawings, of which the following is a brief description:

DETAILED DESCRIPTION

The present invention is predicated upon the provision of one or more assemblies, features or the like to a mass transit vehicle for allowing the vehicle to exhibit one or more desirable characteristics such as greater passenger capacity, handicap accessibility, lower cost, combinations thereof or the like. While it is contemplated that the assemblies or features can be applied to various different mass transit vehicles (e.g., trains or a multi-passenger recreation vehicle), the assemblies or features, either alone or in combination, have been found to be particularly useful for busses. As used herein, the term bus is intended to mean a vehicle having at least four wheels and a seating capacity of at least 8, more typically at least 10, even more typically at least 12, 14 or more. The one or more assemblies and/or features of the bus can include 1, 2, 3, 4 or more of the following:

1) a passenger entrance door that is disposed at an angle of between about 0° and about 80° relative to a fore-aft axis of the bus, preferably between about 5° and 45°, and most preferably between about 5° and 30°;
2) a floor that includes one, two, three, or more portions that are inclined (e.g., disposed at an angle) as they span from the front of the bus to the rear of the bus;
3) a frame that has one or more raised portions 100, lowered portions 102, thinned portions 104, or a combination thereof for accommodating the dimensions and/or design of the body of the bus, for example: a frame drop or thinned frame height for accommodating the slope of the entrance and/or a frame raise and/or drop for accommodating the rear wheels 106 of the bus;
4) a floor of the entry of the bus that is relatively low;
5) a suspension for rearward wheels of the bus that is shortened in height for accommodating the dimension of the bus (e.g., the bus floor);
6) a suspension system adapted to raise and lower the frame to allow both for proper drive height or ground clearance and a low passenger entrance height;
7) openings (e.g., through-holes) in the bus floor that have metal panel material located therein such that the opening can accommodate component of the underbody of the bus; (see reference numerals 110, 112)
8) a sloped entrance portion for accommodating a ramp, lowering the entranceway or both;
9) an angled transmission that is angled downwardly as it moves from the front of the bus to the rear of the bus with drive shaft that is substantially unitary, wherein "unitary" for the purposes of the preferred embodiment of this invention includes multi-piece shafts but does not include transmission systems with a drop-box, although utilizing a drop box in the transmission system is contemplated although not preferred; (see reference numerals 120, 122)
10) a rear "pusher" motor/transmission;
11) a hybrid drive motor including a controller and energy storage system;
12) additional floor supports; and/or
13) frame portions having relative additional width to relative lesser height for accommodating dimension of the bus.

Floor

As one feature or aspect, the bus can have a floor that includes one, two three or more portions, particularly panel portions that are disposed at one or more angles such that the floor of a passenger portion or the bus is inclined upwardly from a forward area of the bus to a rearward area of the bus. With reference to the FIGS. 1-3, a bus 10 is illustrated to include a passenger portion 12 having a first panel portion 14, a second panel portion 16, and a third panel portion 18 all of which cooperatively create an incline from a forward area 22 of the bus 10 to a rearward area 24 of the bus 10.

Figure 1:
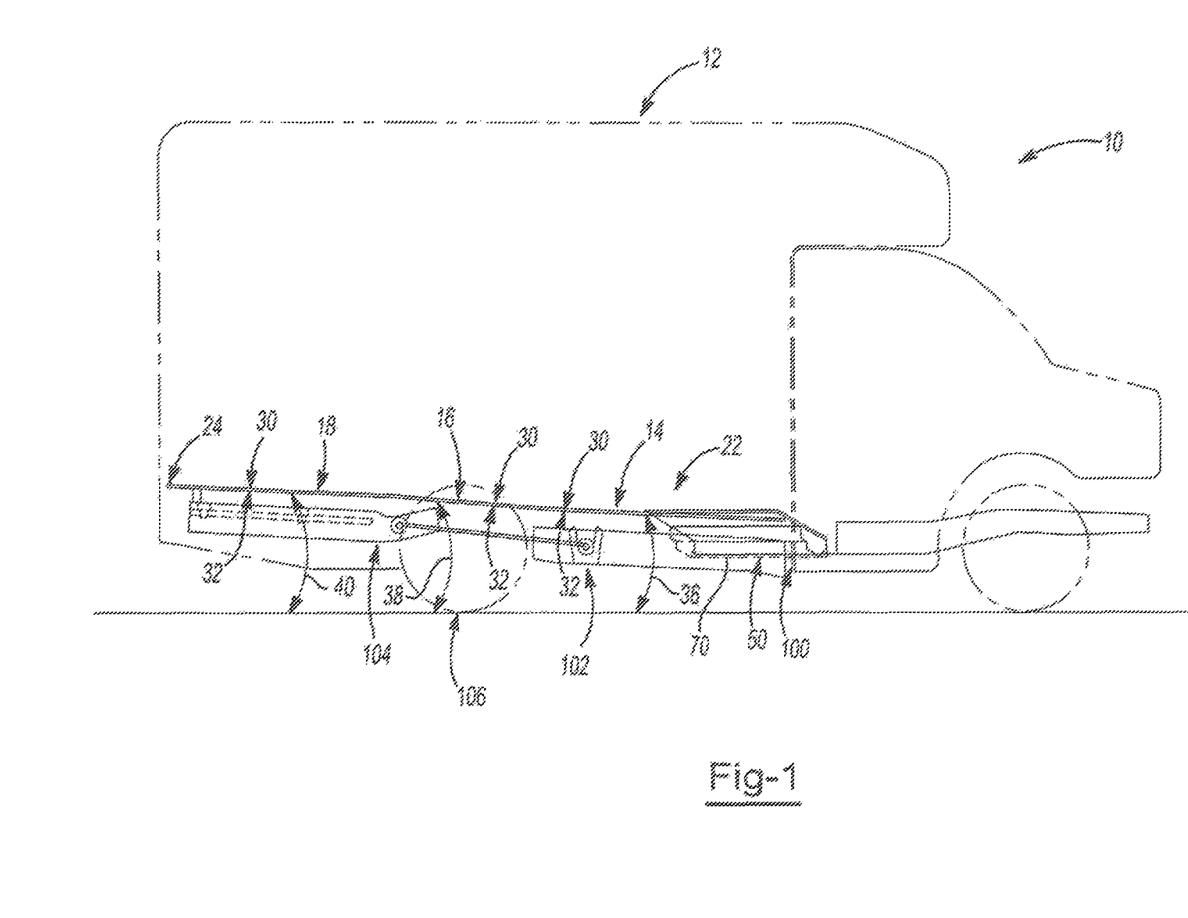
FIG. 1 is a diagram of an exemplary bus in accordance with an aspect of the present invention.
Figure 2:
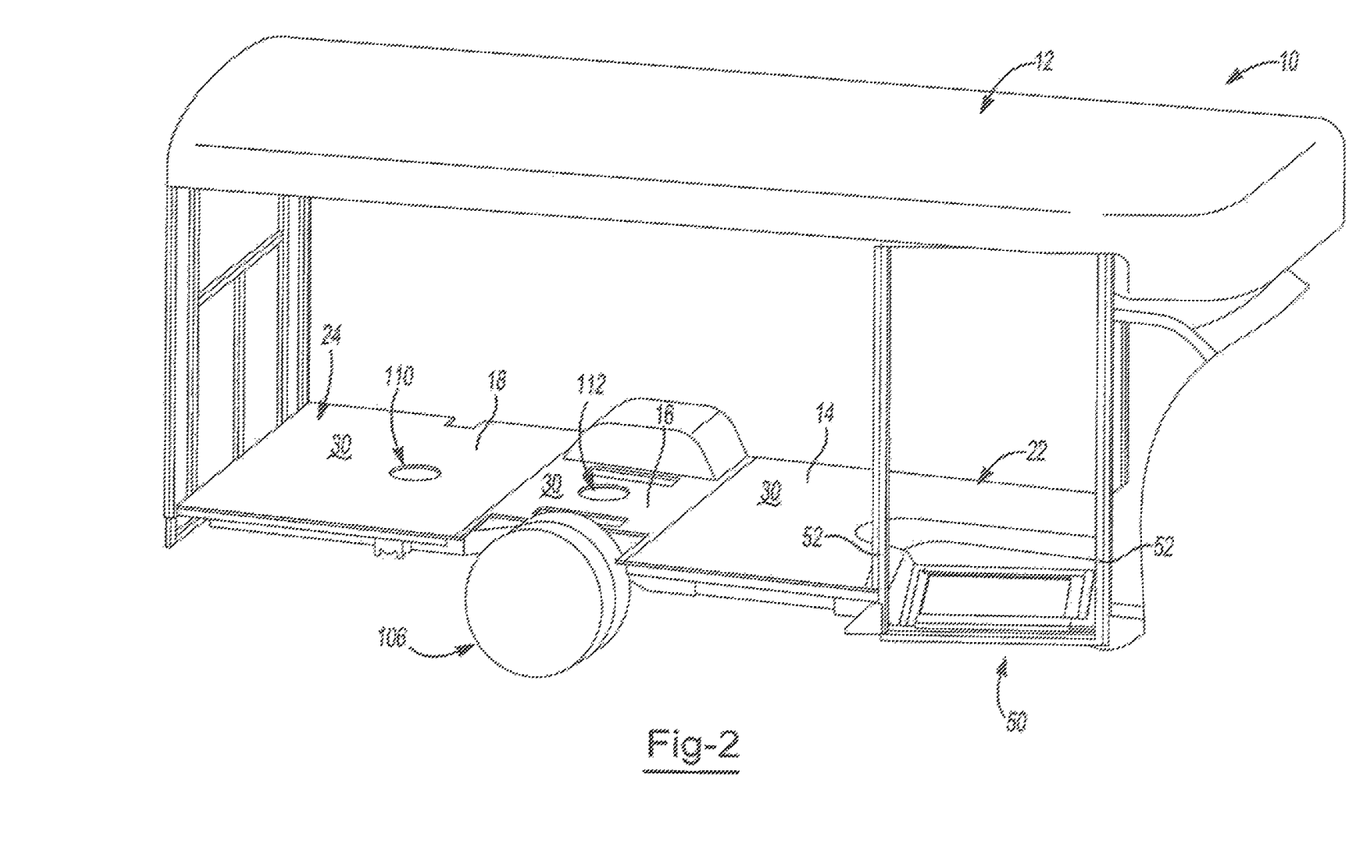
FIG. 2 illustrates a perspective cut-away view of an exemplary bus in accordance with an aspect of the present invention.
Figure 3:
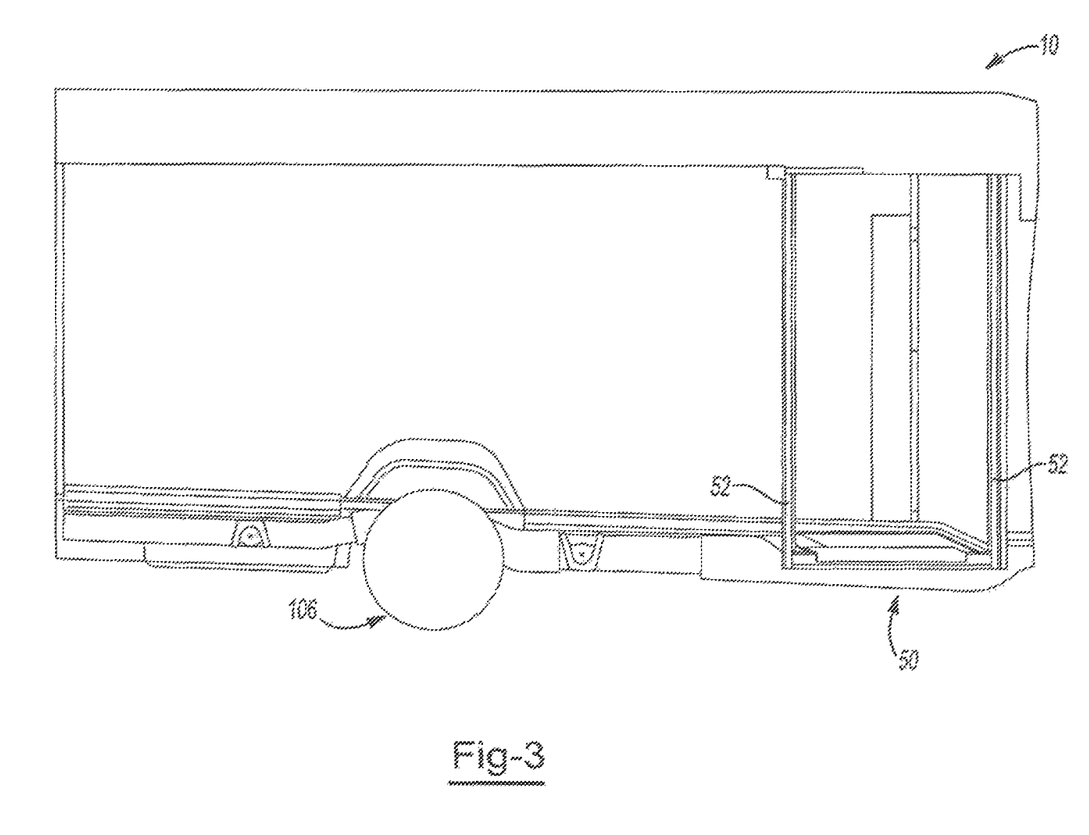
FIG. 3 illustrates a side view of an exemplary bus in accordance with an aspect of the present invention.
Figure 4:
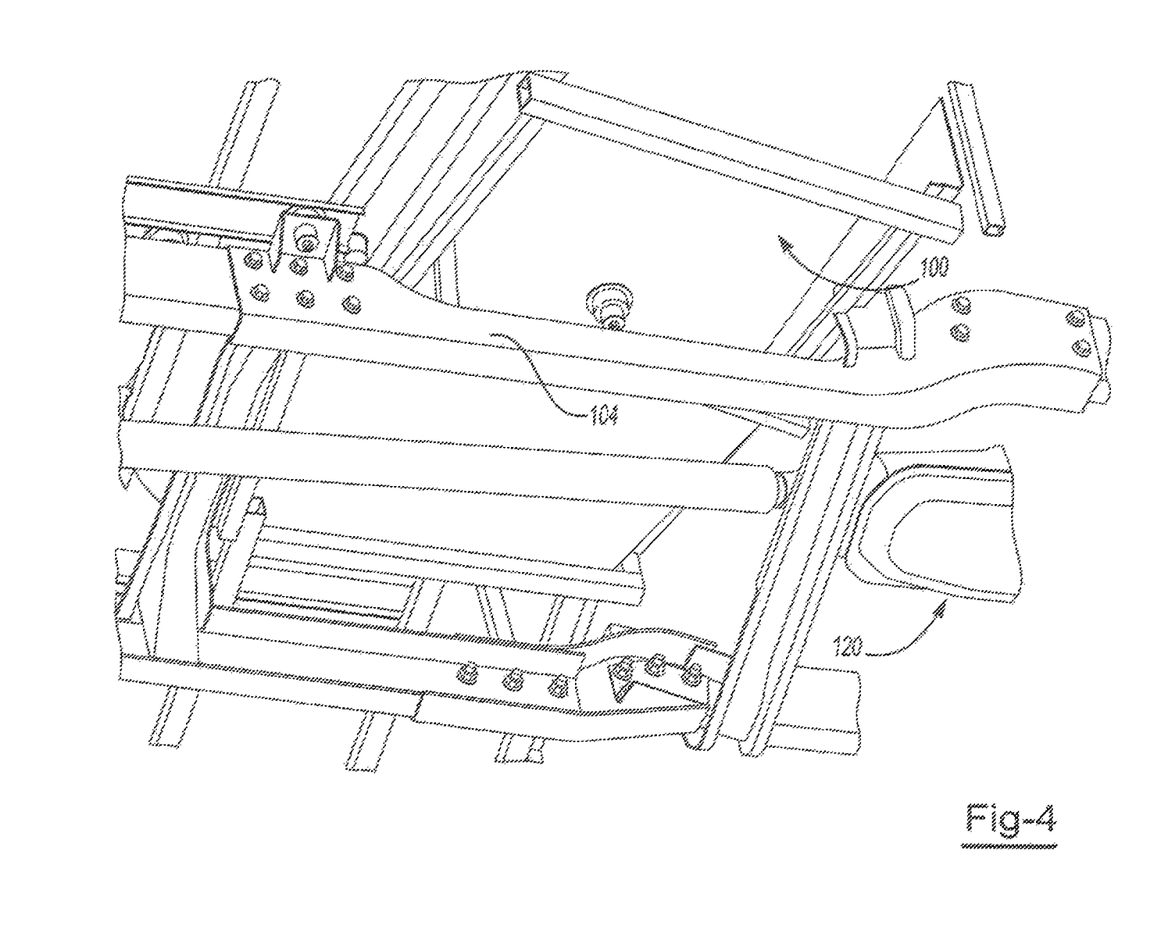
FIG. 4 illustrates a perspective view of an exemplary underbody adjacent an entranceway of an exemplary bus in accordance with an aspect of the present invention.

For creating the incline, the one or more panel portions of the floor are disposed at angles. The angles are taken for a bus with all wheels (fully inflated) disposed upon on a flat surface and the angles are relative to that flat surface. Moreover, the angles are taken for either a top surface, bottom surface or both of the panel portions relative to the flat surface. In the embodiment shown, the first panel portion 14, and particularly a top surface 30, a bottom surface 32 or both of the first panel portion 14 is typically at an angle 36 of at least about 0.8°, more typically at least about 1°, and even more typically at least about 1.5° or 1.8° relative to a flat surface upon which the bus is disposed. Also, the angle 36 is typically less than 5°, more typically less than 3°, and even more typically less than 2.5° or 2.2° relative to the flat surface upon which the bus is disposed. In the embodiment shown, the second panel portion 16, and particularly a top surface 30, a bottom surface 32 or both of the second panel portion 16 is at an angle 38 of at least about 1.5°, more typically at least about 2.5°, and even more typically at least about 3.5° or 3.8° relative to the flat surface upon which the bus is disposed. Also, the angle 38 is typically less than about 7°, more typically less than about 5.5°, and even more typically less than about 4.5° or 4.2° relative to the flat surface upon which the bus is disposed. In the embodiment shown, the third panel portion 18, and particularly a top surface 30, a bottom surface 32 or both of the third panel portion 18 is at an angle 40 of at least about 0.8°, more typically at least about 1°, and even more typically at least about 1.5° or 1.8° relative to a flat surface upon which the bus is disposed. Also, the angle is typically less than 5°, more typically less than 3°, and even more typically less than 2.5° or 2.2° relative to the flat surface upon which the bus is disposed.

The angles of the portions of the bus preferably create an incline such that the floor (i.e., the top or bottom surface) of the bus at the forward area of the bus is lower than the floor of the bus at the rearward area of the bus relative to the flat surface upon which the bus is disposed. Typically, the floor at the forward area 22 of the bus is less than about 95%, more typically less than 90% and even possibly less than about 85%, 80%, or 50% as high as the floor of the rearward area 24 of the bus. It is also typical for the distance between the forward area 22 of the bus and the rearward area 24 of the bus to be at least about 10 feet (300 cm), more typically at least about 13 feet (400 cm), and even possibly at least about 15 to 17 feet (460 cm to 520 cm). It is contemplated that in another embodiment, the distance between the forward area 22 of the bus and the rearward area 24 of the bus to be at least about 17 to 40 feet (460 cm to 1200 cm). The distance between the forward area and the rearward area is typically less than about 35 feet (1050 cm), more typically less than about 30 feet (900 cm) and even possibly less than about 25 feet (750 cm). It is contemplated that in another embodiment, the distance between the forward area and the rearward area is typically less than about 30 feet (900 cm), more typically less than about 21 feet (640 cm) and even possibly less than about 19 or 17 feet (580 or 520 cm).

Any one, two or three of the first panel portion, the second panel and/or the third panel portion each are angled along and/or extend along a percentage of the distance between the forward and rearward portion. That percentage is typically at least about 10%, more typically at least about 20% and even possibly at least about 30% of the distance. That percentage is typically less than about 50%, more typically less than about 40% and even possibly less than about 35% of the distance.

Although illustrated with three panel portions, it will be understood that the floor may be divide into fewer portions or more portions with the given angles to create the incline.

Entrance Angle

An additional feature of the bus of the present invention is to have the door disposed at an angle relative to the fore-aft axis of the bus. As can be seen in the FIG. 5, a fore-aft axis (A) extends along a length (L) of the bus. The passenger entranceway 50 to the bus 10 includes a frame 52. Such frame 52 typically defines an opening into which the bus door 54 is fit. When the door 54 is in a closed position, it is typically substantially planar or lies substantially within a plane. In a preferred embodiment, the bus door 54, the plane in which the door lies or both are disposed at an angle 64 relative to the fore-aft axis (A) of the bus 10. Preferably, the angle 64 lies in or opens is a plane that is substantially or entirely perfectly horizontal, is substantially or entirely perfectly parallel to the flat surface upon which the wheels of the bus are disposed, is substantially or entirely perpendicular to the plane in which the door lies or any combination thereof. The angle 64 is typically at least about 5° (although it could be 0°, particularly in the longer length vehicles), more typically at least about 10°, and possibly at least about 15° or 20°. The angle 64 is also typically less than about 70°, more typically less than about 45° and even possibly less than about 30° or 20°.

The overall length (L) of the bus (e.g., from front bumper periphery to rear bumper periphery) is typically at least about 15 feet (450 cm), more typically at least about 19 feet (580 cm) and even possibly at least about 22 feet (670 cm). The length (L) is also typically less than about 40 feet (1220 cm), more typically less than about 30 feet (915 cm) and even possibly less than about 27 feet (823 cm). Length of these vehicles may also be typically defined in terms wheel base (e.g. distance between the centers of the front and rear axles). The typical wheel bases for these vehicles may be greater than about 135 inches (345 cm) and less than about 260 inches (660 cm), although the present invention contemplates even wheel bases of greater length (e.g. about 670 cm to about 1200 cm).

Figure 5:
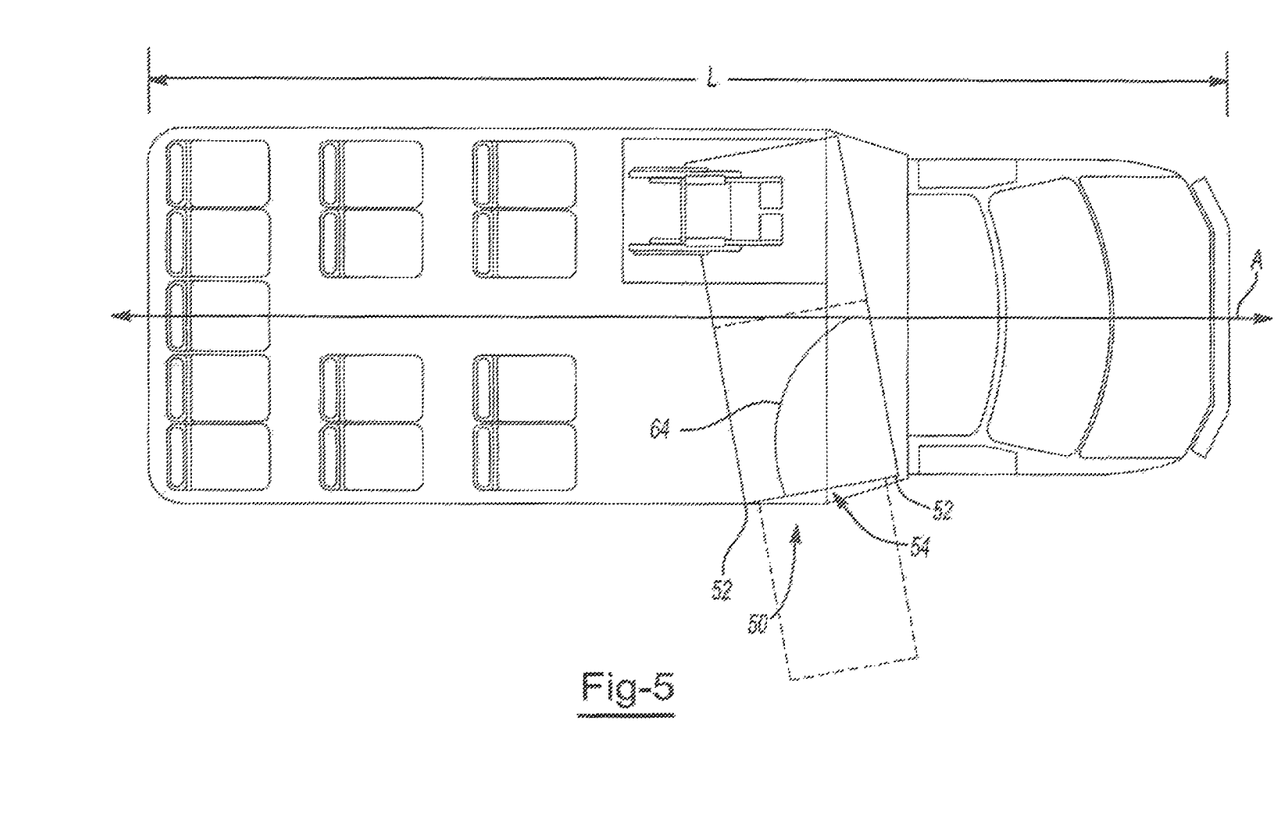
FIG. 5 illustrates a top cut away view of an exemplary bus in accordance with an aspect of the present invention.

It is also contemplated that the passenger entranceway 50 of the bus 10 can include a ramp assembly 126 such that a ramp can be extended outwardly from the passenger entranceway 50 of the bus 10. Such a ramp assembly 126 may be manual, automatic, or a combination thereof and may be powered by a hydraulic system, and electrical system or a combination thereof.

As an additional or alternative feature, a lowest portion 70 of the passenger entranceway 50 is relatively close to the flat surface upon which the wheels of the bus are disposed when the bus is disposed on such a flat surface. Typically, the lowest portion 70 is less than about 25 inches (63.5 cm), more typically less than about 18 inches (45 cm) and even possible less than about 16, 13, or 11 inches (40, 33 or 28 cm) from the surface. Typically the lowest portion 70 is greater than 4 inches (10 cm), more typically greater than about 8 inches (20 cm) and even possibly greater than 9 or 10 inches (22 or 25 cm) from the surface. These distances can be accomplished by virtue of the various features described herein. Moreover, it may be the case that such distances are accomplished using a movable suspension lift system as described below.

As an additional or alternative aspect, the bus can have a desired number of dedicated seats, seating locations or a combination thereof. As used herein, a dedicated seat is a seat designed for one adult individual and a seating location is a seat or location on the bus designed for one handicapped person (e.g., an individual in a wheelchair. It is contemplated that a bus according to the present invention can have dedicated seats, seating locations or a combination thereof sufficient for at least ten individuals, at least fourteen individuals, at least eighteen individual or at least twenty-two individuals. The bus can also have dedicated seats, seating locations or a combination thereof sufficient for less than forty individual, less than thirty individuals, less than twenty-five individual or less than twenty individuals. Of course, the bus can have higher or lower number of dedicated seats or seating locations, unless otherwise specified.

Transmission System

As an additional or alternative aspect, the bus can have a transmission system that essentially transmits the rotary drive motion from the engine to the rear axle via a drive shaft. In a preferred embodiment, this transmission system is essentially direct (e.g. via a unitary multi-piece shaft), but in some instances the use of a drop-box system (e.g. a system to vertically drop the drive motion via gearing or chains) to lower the drive shaft is contemplated. An exemplary drop-box system can be found in U.S. Pat. No. 6,702,057 incorporated herein by reference for all purposes.

It is also contemplated that at an output point of the transmission to the drive shaft should be at a height of no greater than about 18 inches (45 mm) above a support plane of the wheels (e.g. the centerline of the wheels) when being driven or at about 14 inches (35 mm) when the vehicle is kneeled or in the lowered position.

In another preferred aspect of the present invention, relevant to the drive engine and transmission vertical position, an independent front suspension like a short-long-arm ("SLA") which permits a lower engine position in the chassis may be used. Other systems, such as a solid front axle or twin beam system, common in Ford vehicles of this class and type, are contemplated, although this may force the engine up several inches and may preclude a direct connection of the drive shaft to the transmission without the use of a drop box or transfer case. Additionally, as the buses get larger, with longer wheelbases, the bus could be built on a medium duty chassis with a solid beam front axle and a drop box to lower the drive line, also a rear engine version is contemplated.

In another preferred aspect of the present invention, relevant to the drive engine and transmission vertical position, a solid rear axle may be utilized. Other known systems, such as multi-piece rear axles with a differential, are contemplated to allow for a lower vertical position of the drive shaft. One such system is taught in U.S. Pat. No. 6,039,351 incorporated herein by reference for all purposes.

In yet another preferred aspect of the present invention, a solid front axle may be used instead of the independent suspension.

Movable Suspension Lift System

Figure 6:
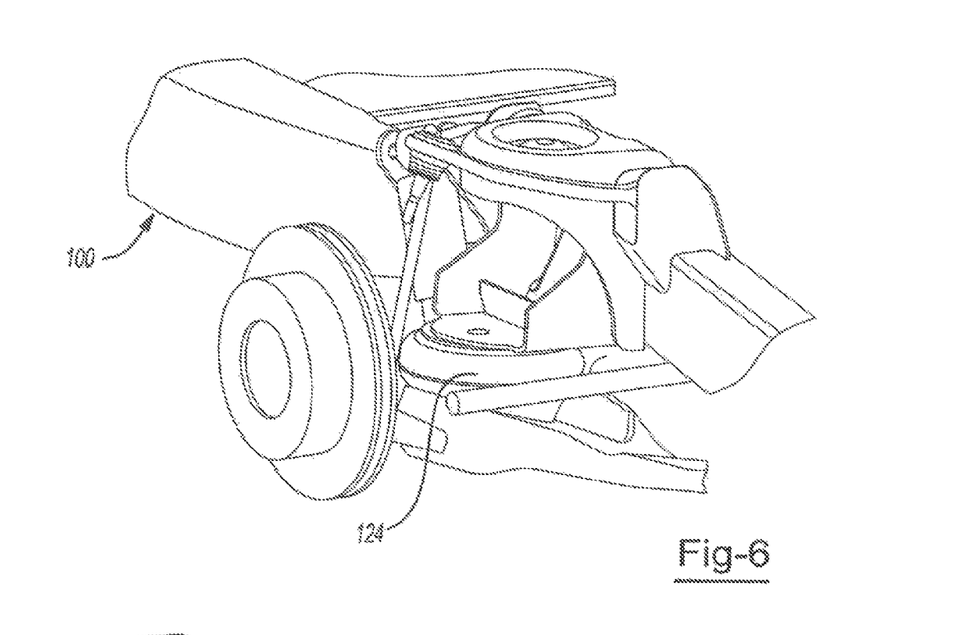
FIG. 6 illustrates a perspective view of an exemplary underbody showing an exemplary suspension lift in the raised position in accordance with an aspect of the present invention.
Figure 7:
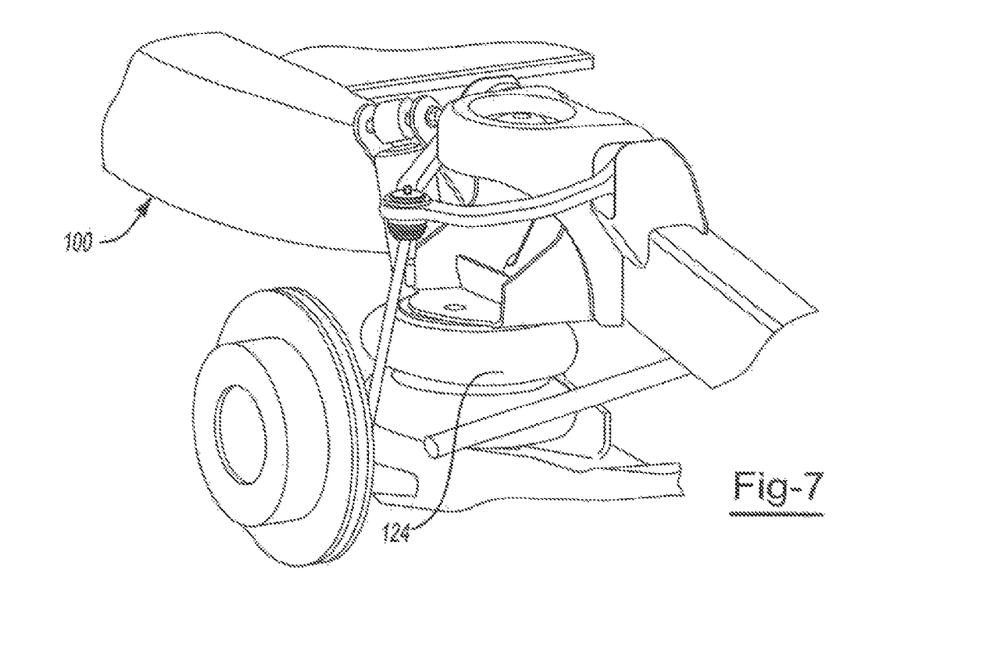
FIG. 7 illustrates a perspective view of an exemplary underbody showing an exemplary suspension lift in the lowered position in accordance with an aspect of the present invention.

As an additional or alternative aspect, the bus can have a suspension system connected to the body structure and the frame assembly adapted to raise and lower at least the entrance of the vehicle, but preferably to raise and lower the body structure, the drive motor and the drive transmission vertically relative to the flat surface upon which the wheels of the mass transit vehicle are disposed. At least in one embodiment, the movable suspension lift system moves the lowest portion of the entranceway to the previously discussed desired distances from a flat surface upon which the vehicle is disposed. It is contemplated that this movable suspension can be accomplished in any number of ways known to one skilled in the art (e.g. direct pneumatic lift cylinders, direct hydraulic lift cylinders, two-bar lift systems, four-bar lift systems, airbag lifts, or the like). In a preferred embodiment, the suspension may include an airbag lift mechanism 124, as exemplarily shown in FIG. 7 in the raised position and in FIG. 6 in the lowered or kneeling position, that is pneumatically actuated to lower the vehicle from a maximum position (e.g. driving position with maximum ground clearance to the frame) to a minimum position (e.g. passenger loading position with minimum ground clearance to the frame). Preferably the movable range of the suspension system is at least about 2 inches (5 cm), more preferably at least about 3 inches (7.5 cm) and most preferably at least about 4 inches (10 cm) or more.

Solid Rear Axle Example

Figure 8:
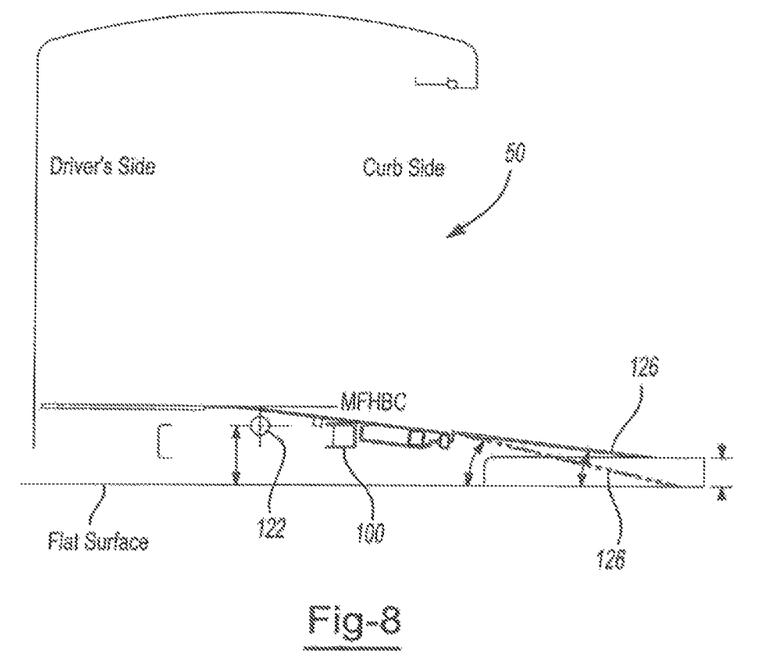
FIG. 8 illustrates a side cut away view of an exemplary bus through the door in accordance with an aspect of the present invention.
Figure 9:
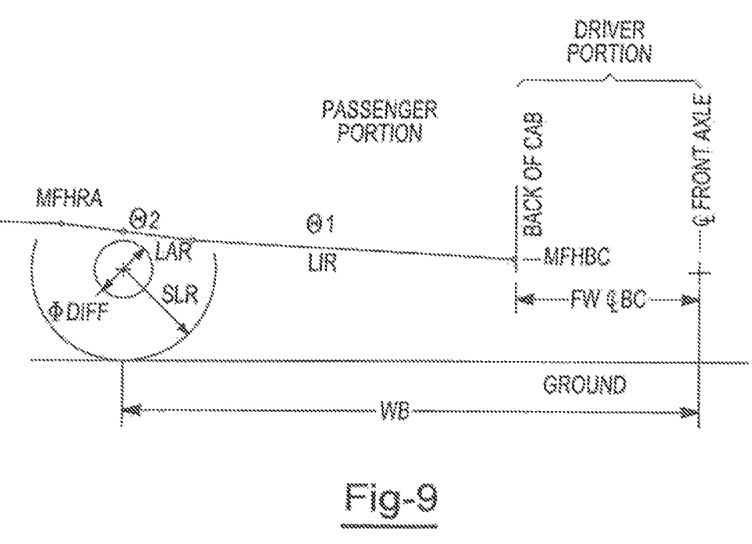
FIG. 9 illustrates a side view of an exemplary floor and rear wheel in accordance with an aspect of the present invention.
Figure 10:
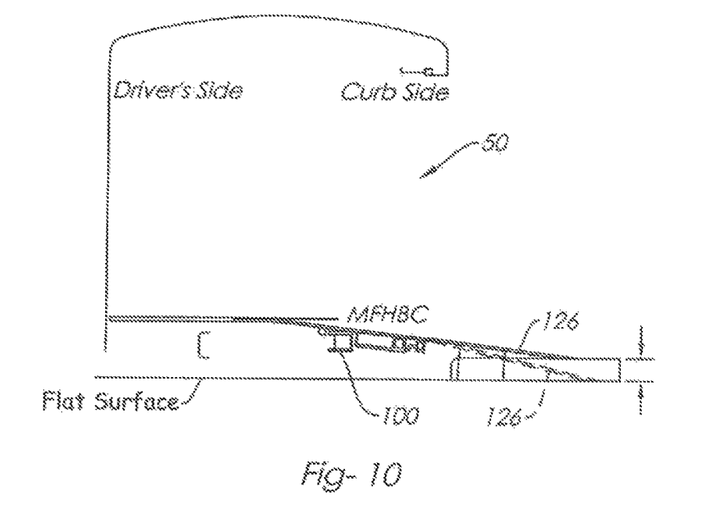
FIG. 10 illustrates a side cut away view of another exemplary bus through the door in accordance with an aspect of the present invention.
Figure 11:
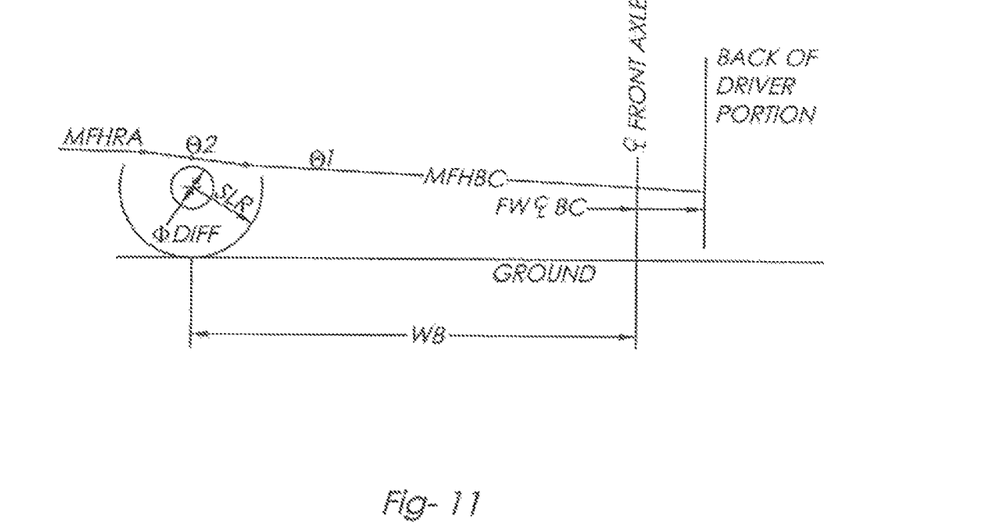
FIG. 11 illustrates a side view of another exemplary floor and rear wheel in accordance with an aspect of the present invention.
Figure 12:
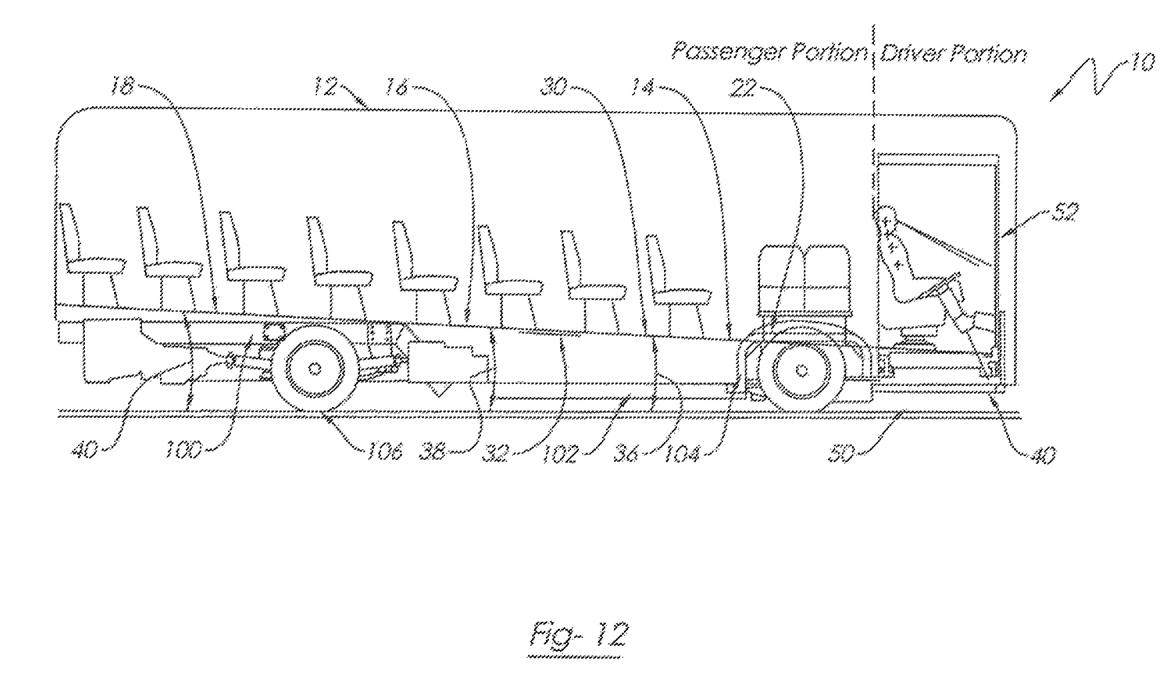
FIG. 12 illustrates a diagram of another exemplary bus in accordance with an aspect of the present invention.
Figure 13:
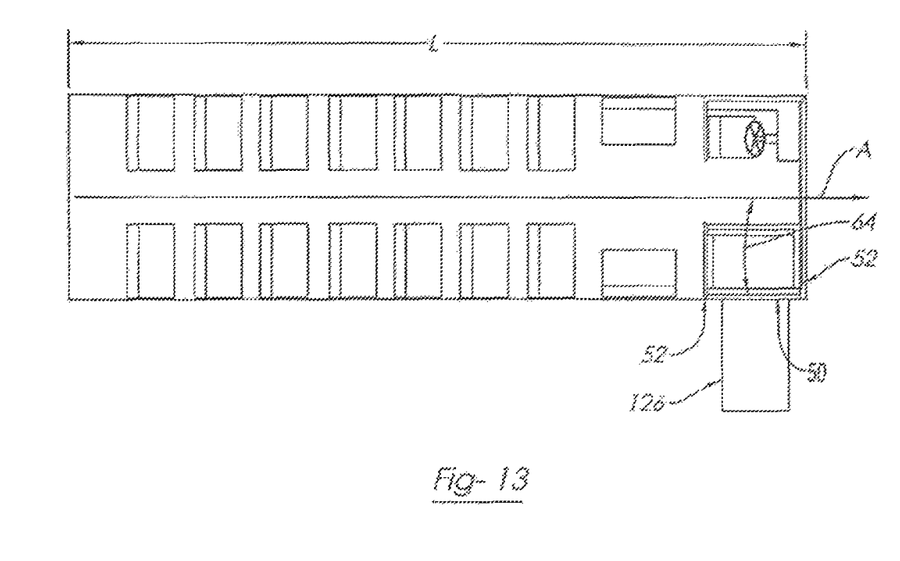
FIG. 13 illustrates a top cut away view of another exemplary bus in accordance with an aspect of the present invention

In an exemplary illustration, shown in FIGS. 8-9, a range of values (+/−10%) may be calculated for a number of vehicle packaging variables that may be of interest so that the vehicle can meet the handicapped accessibility requirements or other goals described for the present invention. These variables may include such as: the height of the floor of the vehicle at different fore-aft positions (e.g. rear axle region and near the driver/passenger portion interface region), the length and/or angles of panel portions, door height when vehicle is in a lowered position, and vehicle drive and/or transmission components. These variables may be solved by using the following formulas:

$$MFHBC = ETH + [VW/2] * TAN(\theta SR)$$

$$LIR = WB - FWCLBC - LZ$$

$$MFHRA_B = MFHBC + LIR * TAN(\theta 1) + LZ * TAN(\theta 2)$$

$$MFHRA_C = SLR + [\varnothing DIFF/2] + KCLRA + FT$$

$$MFHRA_B \geq MFHRA_C$$

Wherein the terms are defined as follows:
WB=Vehicle Wheelbase
VW=Vehicle Width
SLR=Tire Static Load Radius
ØDIFF=Diameter of Rear Axle Differential Bowl
ØDIS/S=Diameter of Driveshaft
ETH=Body entrance Threshold Height, Vehicle in lowered position—"Kneeled" (lowest portion of the passenger entranceway)
θSR=Stowed ramp angle
FWCLBC=Front Wheel Centerline to Back of Driver Portion
LAR=Length of Rear Axle Region (Floor Panel Portion)
LIR=WB−FWCLBC−LZ
FT=Floor Thickness
KCLDS=Kneeled Clearance, Floor to Drive Shaft
KCLRA=Kneeled Clearance, Floor to Rear Axel Housing
θ1=Side View Angle of Intermediate Region Floor (Floor Panel Portion)
θ2=Side View Angle of Rear Axle Region Floor (Floor Panel Portion)
MFHBC=Minimum Floor Height at Back of Driver Portion, Kneeled
MFHRA=Minimum Floor Height at Rear Axle Centerline, Kneeled
DSO—Drive Shaft Offset from Vehicle Centerline
DSCLG=Drive Shaft Centerline to Ground, Kneeled
$MFHRA_B$=Minimum Floor Height based upon a set floor height, Rear Axle Region
$MFHRA_C$=Minimum Floor Height based upon a set chassis height, Rear Axle Region Rear Engine Example It is contemplated that the chassis on which the present invention is based is a rear engine or pusher chassis, for example as illustrated in FIGS. 10-13. It may be a stripped chassis and may require the construction of a complete body including the driver portion. In this version the angled floor as described above may be used to again provide an uninterrupted floor in the passenger area. It is contemplated that the floor would be continuous from the passenger entranceway 50 to the rear of the bus and complies with the same formula described above. In this example, the passenger entranceway 50 may be forward of the front wheels (and in the driver portion). The height at the rear may be greater than that of a shorter buss (e.g. less than about 24 feet) as it would need to clear at least any structure over the rear axle and could potentially be increased to clear the rear mounted engine. However, it is contemplated that in certain cases, the floor may not be able to clear the engine, depending upon the height of the engine. Preferably, the passenger door entrance, the floor height, slope and connection from front to rear will follow the same criteria as described above, but may by nature dictate that the rear engine version be longer to meet these.

It is contemplated that this rear engine example may have capability of more seating positions because of the uninterrupted passenger floor. It is believed that current low floor products require steps to transition from the low front area of the bus to the high rear area over the engine. For the same length bus, the present invention could have 4-8 more seats.

The present invention could also provide storage area under the passenger floor within the wheelbase while still complying with ADA criteria. It is believed that current high floor touring buses provide more storage under the floor but can only comply with ADA through use of a lift.

It is also contemplated that the present invention could provide a unique and simple way to incorporate hybrid drive systems, by connecting directly to the rear axle. The engine/transmission would power the bus the same as any current rear engine or pusher bus. The difference would be that the rear axle would have an input yoke on both the rear side and the front side of the differential. The second axle may be driven by attaching a short shaft to the back of the forward axle to drive the second axle. It is contemplated that the present invention may use this type of axle to permit a parallel hybrid system to be attached to the rear axle. This type of package may be possible because the floor slants from the rear to the front and provides space underneath and between the axles to package not only the hybrid drive motor but also the controller and energy storage system. The energy storage could be either ultra-capacitors or any type of battery pack. It is contemplated that by connecting a hybrid system in this manner it may permit complete separation of the 2 power sources and allow continued operation should either system fail.

In this example, the storage area below the passenger floor and within the wheelbase may also provides room for package of alternate and conventional fuel storage, lowering the center of gravity. It is believed that alternate fuel storage such as Compressed Natural Gas, on current rear engine low floor buses must be located on the roof of the vehicle. This has the disadvantage of raising the overall Center of Gravity of the vehicle.

U.S. Handicap Accessibility Requirements

The features discussed herein, alone or in any combination, can assist a vehicle in abiding by one or any combination of the regulations discussed below. Of particular significance for such assistance is at least one or any combination of: the movable suspension lift system (e.g. level-change mechanism), the floor angles, door frame height and the ramp system (e.g. boarding device) disclosed herein that enables the present invention to meet and/or exceed at least part of the below requirements (which are excepts taken from 36 CFR Part 1192 as amended through September 1998):

Subpart B-Buses, Vans and Systems
§1192.21 General
(a) New, used or remanufactured buses and vans (except over-the-road buses covered by subpart G of this part), to be considered accessible by regulations issued by the Department of Transportation in 49 CFR part 37, shall comply with the applicable provisions of this subpart.
(b) If portions of the vehicle are modified in a way that affects or could affect accessibility, each such portion shall comply, to the extent practicable, with the applicable provisions of this subpart. This provision does not require that inaccessible buses be retrofitted with lifts, ramps or other boarding devices.

§1192.23 Mobility Aid Accessibility
(a) General. All vehicles covered by this subpart shall provide a level-change mechanism or boarding device (e.g., lift or ramp) complying with paragraph (b) or (c); of this section and sufficient clearances to permit a wheelchair or other mobility aid user to reach a securement location. At least two securement locations and devices, complying with paragraph (d) of this section, shall be provided on vehicles in excess of 22 feet in length; at least one securement location and device, complying with paragraph (d) of this section, shall be provided on vehicles 22 feet in length or less.
(5) Slope. Ramps shall have the least slope practicable and shall not exceed 1:4 when deployed to ground level. If the height of the vehicle floor from which the ramp is deployed is 3 inches or less above a 6-inch curb, a maximum slope of 1:4 is permitted; if the height of the vehicle floor from which the ramp is deployed is 6 inches or less, but greater than 3 inches, above a 6-inch curb, a maximum slope of 1:6 is permitted; if the height of the vehicle floor from which the ramp is deployed is 9 inches or less, but greater than 6 inches, above a 6-inch curb, a maximum slope of 1:8 is permitted; if the height of the vehicle floor from which the ramp is deployed is greater than 9 inches above a 6-inch curb, a slope of 1:12 shall be achieved. Folding or telescoping ramps are permitted provided they meet all structural requirements of this section.

§1192.25 Doors, Steps and Thresholds
(c) Door height. For vehicles in excess of 22 feet in length, the overhead clearance between the top of the door opening and the raised lift platform, or highest point of a ramp, shall be a minimum of 68 inches. For vehicles of 22 feet in length or less, the overhead clearance between the top of the door opening and the raised lift platform, or highest point of a ramp, shall be a minimum of 56 inches.

It is to be understood that the features of the present invention can assist a vehicle in abiding by these regulations; however, a vehicle need not abide by these regulations unless otherwise specifically stated.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The following discussion applies to the teachings as a whole. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. References to the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items); such additional items are also contemplated, unless otherwise stated.

It is understood that the above description is intended to be illustrative and not restrictive. Many embodiments as well as many applications besides the examples provided will be apparent to those of skill in the art upon reading the above description. It is further intended that any combination of the features of different aspects or embodiments of the invention may be combined. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A mass transit vehicle, having at least four tires, mounted on at least four wheels, at least two mounted on a front axle, and at least two on a rear axle respectively, the mass transit vehicle comprising:
    a frame assembly adapted for supporting a body structure including at least one passenger entranceway, wherein the frame assembly includes a variable sectional height;
    the body structure including a driver portion disposed forward of a passenger portion wherein the at least one passenger entranceway is located in the driver portion and the driver portion and the passenger portion includes a floor having one, two, three, or more panel portions disposed at an angle to form an incline, the passenger entranceway defined by a door frame with a lower portion disposed at an angle relative to a fore/aft axis of the mass transit vehicle and the lower portion of the passenger entranceway disposed no greater than about 35.5 cm from a flat surface, when the wheels of the mass transit vehicle are disposed upon the flat surface;
    a drive motor connected to a drive transmission, both at least partially supported by the frame assembly disposed substantially near a rear end of the vehicle and disposed at a drive angle, for transmitting power to the rear axle via a drive shaft that is substantially unitary;
    a suspension system connected to the body structure and the frame assembly; and
    a deployable ramp connectively disposed at the lower portion of the passenger entranceway adapted to provide an access pathway from at least the flat surface upon which the wheels of the mass transit vehicle are disposed to the floor of the passenger portion.

2. The mass transit vehicle of claim 1, wherein the variable sectional height of the frame assembly is disposed lower at the back of the driver portion or front of the passenger portion to clear the deployable ramp.

3. The mass transit vehicle of claim 1, wherein the angle relative to a fore/aft axis of the mass transit vehicle of the passenger entranceway is at least greater than about 5° and less than about 30°.

4. The mass transit vehicle of claim 1, wherein the drive motor includes a hybrid system.

5. The mass transit vehicle of claim 1, wherein the suspension system is adapted to raise and lower the body structure, the drive motor and the drive transmission vertically relative to the flat surface upon which the wheels of the mass transit vehicle are disposed.

6. The mass transit vehicle of claim 1, wherein the mass transit vehicle has a wheelbase of at least greater than about 670 cm and less than about 1200 cm.

7. The mass transit vehicle of claim 1, wherein the drive shaft is a minimum distance of about 26 cm from the flat surface upon which the wheels of the mass transit vehicle are disposed thereto and at least about 1 cm below a bottom side of the floor.

8. The mass transit vehicle of claim 1, wherein the deployable ramp in a deployed position having a ramp angle no greater than about 14° relative to the flat surface upon which the wheels of the mass transit vehicle are disposed thereto.

9. The mass transit vehicle of claim 8, wherein the deployable ramp in the deployed position is at least about 1.0 m to about 2.5 m in length.

10. The mass transit vehicle of claim 1, wherein the angle to form an incline of the passenger portion floor is individually less than about 4.7° from the flat surface in any of the one, two, three, or more panel portions respectively.

11. A mass transit vehicle with a wheelbase of at least greater than about 670 cm and less than about 1200 cm, having at least four tires mounted on at least four wheels, at least two mounted on a front axle and at least two on a rear axle respectively, the mass transit vehicle comprising:
    a frame assembly adapted for supporting a body structure including at least one passenger entranceway, wherein the frame assembly includes a variable sectional height;
    the body structure including a driver portion disposed forward of a passenger portion wherein the at least one passenger entranceway is located in the driver portion and the driver portion and passenger portion includes a floor having one, two, three or more panel portions disposed at angle to form an incline, the passenger entranceway defined by a door frame with a lower portion disposed as an angle of at least about 0° relative to a fore/aft axis of the mass transit vehicle and the lower portion of the passenger entranceway disposed no greater than about 35.5 cm from a flat surface upon which the wheels of the mass transit vehicle are disposed;
    a drive motor connected to a drive transmission, both at least partially supported by the frame assembly disposed substantially near a rear end of the vehicle for transmitting power the rear axle via a drive shaft;
    a suspension system connected to the body structure and the frame assembly, the suspension system adapted to raise and lower the body structure, the drive motor and the drive transmission vertically a distance of at least about 7.0 cm relative to the flat surface upon which the wheels of the mass transit vehicle are disposed; and
    a deployable ramp connectively disposed at the lower portion of the passenger entranceway adapted to provide an access pathway from at least the flat surface upon which the wheels of the mass transit vehicle are disposed to the floor of the passenger portion, wherein the deployable ramp in a deployed position having a ramp angle no greater than about 14° relative to the flat surface upon which the wheels of the mass transit vehicle are disposed thereto.

12. The mass transit vehicle of claim 5, wherein the suspension system moves vertically a distance relative to the flat surface at least greater than about 7 cm and less than about 14 cm.

* * * * *